SHIFT REGISTER CONTROL FOR TYPESETTING MACHINES

Filed Jan. 19, 1967 3 Sheets-Sheet 1

Sept. 30, 1969 R. A. PROUD, JR., ET AL 3,470,539

SHIFT REGISTER CONTROL FOR TYPESETTING MACHINES

Filed Jan. 19, 1967 3 Sheets-Sheet 2

United States Patent Office 3,470,539 Patented Sept. 30, 1969

3,470,539

SHIFT REGISTER CONTROL FOR TYPESETTING MACHINES

Ralph A. Proud, Jr., Somerset, N.J., Richard C. O'Brien, Centerville, Ohio, and Seth Graubert, Neil Schleifman, and Theodore J. Goldstein, Long Island, N.Y., assignors To Harris-Intertype Corporation, Cleveland, Ohio, a corporation of Delaware Filed Jan. 19, 1967, Ser. No. 610,300
Int. Cl. G11b *13/00;* G11c *19/00*
U.S. Cl. 340—172.5 8 Claims

ABSTRACT OF THE DISCLOSURE

An electronic shift register receives coded inputs from a keyboard or a perforated tape reader and passes the coded information to a typesetting machine at regular intervals. When used with the keyboard, provisions are made to store temporarily a number of codes while the typesetting machine performs some functions not associated with the selection of characters, such as the elevate function in a linecasting machine, permitting the operator to continue keyboarding while this function is completed. Delays are also provided automatically, as needed, as for the selection of a double letter. The shift registers operate automatically to move information from their input to their output at a faster rate if the output can accept the information, and to store the information in the register, backed up from its output, until the typesetting machine is able to use the information from the shift register output.

Cross references to related applications

In typesetting machinery various forms of machines may be used to compose lines of composition. The machine may be of the so-called hot-metal recirculating matrix type, often called linecasting machines, or of the photographic recirculating matrix type such as shown in U.S. Patent No. 2,395,659, or it may be a different form of photographic typesetting machine such as incorporating a rotating master character disc or stencil, as described in U.S. Patent No. 3,141,395, or a stationary master character plate from which images of characters are produced in selected selection, as shown in U.S. Patent No. 3,106,880.

In any event, particularly with the machines of the recirculating matrix type, it may be desirable to provide for direct control of the machine through a keyboard such that the compositor can "set" type on the keyboard and have the machine function almost instantaneously. Machines of this type are capable of selecting characters at a substantially constant rate, in other words in a select type of operation, but various functions required of the machine may employ several cycles, and unless provisions are made for this occurrence, the keyboard operator must wait for the machine to be readied for the next character selection. In a similar fashion, if a keyboard operated perforator is used to generate control tape for a typesetting machine, and is also provided with a so-called hard copy output, such as a typewritten output, which can be checked by the operator, there are times when the hard copy printer may delay the operator unnecessarily. Use of shift registers to minimize this delay are disclosed in the copending application of William A. Hadley Ser. No. 610,271, filed on even date herewith.

Brief summary of the invention

This application relates to an electronic shift register, and particularly to a shift register adapted for use in connection with typesetting machines or controls therefor. The present invention is particularly concerned with shift register devices which can accept a coded input, from a manually operated keyboard, or in some instances from a tape reader, at a somewhat random rate. The shift register is controlled to supply these codes, in the selected sequence, to the operating unit (generally including a decoding device) of the typesetting machine at a rate which can be described as "on demand" from the machine.

Accordingly, the primary object of the present invention is to provide a novel electronic shift register which can accept code information at one rate, which may or may not be a relatively steady rate, and supply the code information at a somewhat different, and steadier, but at times interrupted, rate to a typesetting machine or to some type of printing equipment which can produce a copy corresponding to the coded line composition information; and to provide such a shift device register in which the coded information is accepted at one or more input storage registers and advanced at a much faster rate toward output storage registers, through intermediate storage registers in sufficient number to accommodate temporary code information that may collect in the register due to a temporary increase in the input rate over the rate at which the output is passing from the register.

Other objects and advantages of the invention will become more apparent from the following description, the accompanying drawings and the appended claims.

Description of preferred embodiments

Figures 1, 2, 4:
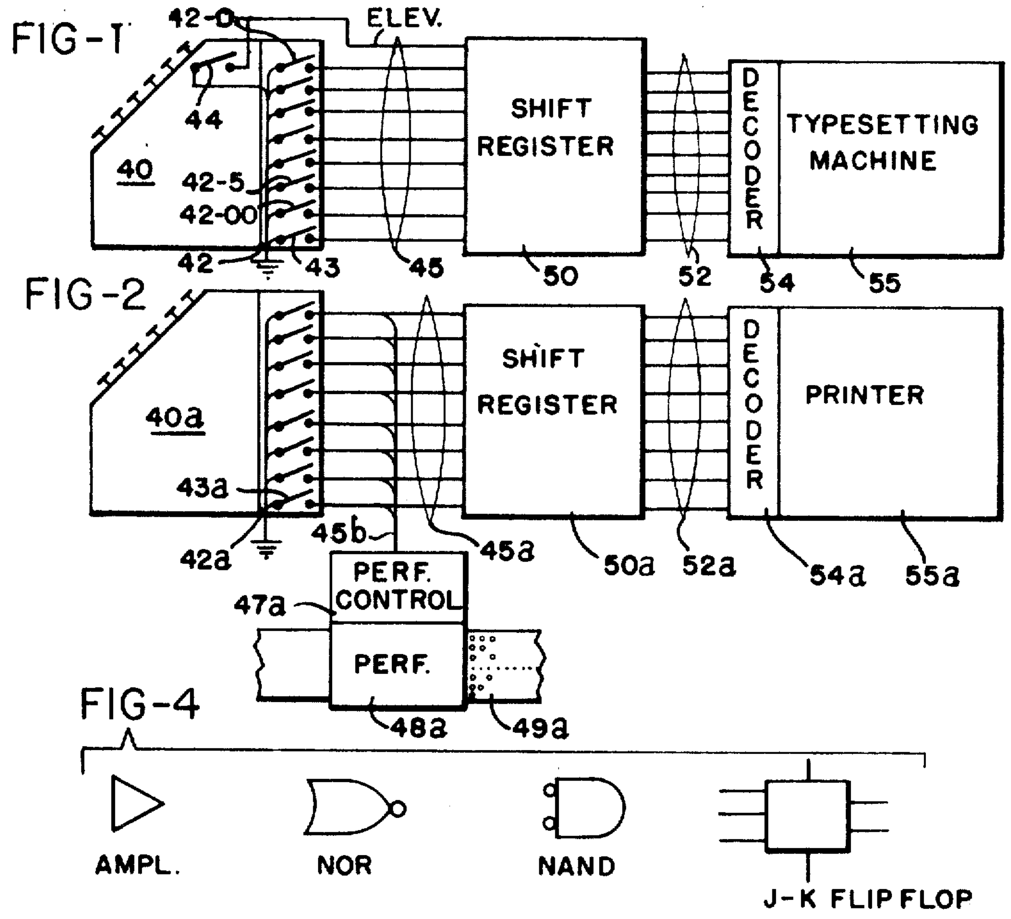
FIG. 1 is a block diagram illustrating one form of typesetting equipment embodying a shift register device according to the invention.
FIG. 2 is a block diagram illustrating another form of typesetting equipment using the shift register device.
FIG. 4 is a schematic diagram explaining the symbols used in FIG. 3.

Referring to the drawings, which illustrate a preferred embodiment of the invention, before explaining the details of the circuitry, it is desirable to understand the symbols which are used. FIG. 4 is an illustration showing four typical logic symbols that are used in this specification. An amplifier is illustrated as a triangle, with the output at the right or apex of the triangle. An OR gate is illustrated as having its input in the form of a concave line and its output in the form of curved lines joined at a point. If a circle is included at the point, this is indicative of a logic negation, hence a NOR gate. For example, with a regular OR gate, a high signal at any one of its inputs would result in a high at the output, but if the logic negation is applied, then the output would be a low signal.

Similarly, and AND gate is illustrated as having a straight line at its input and a curved or semi-circle line at its output. Two or more high signals, for example, existing simultaneously at its input will result in a high signal at its output. If the logic negations are applied at the input, the two low signals at the input, simultaneously, will result in a high signal output.

Figure 5:
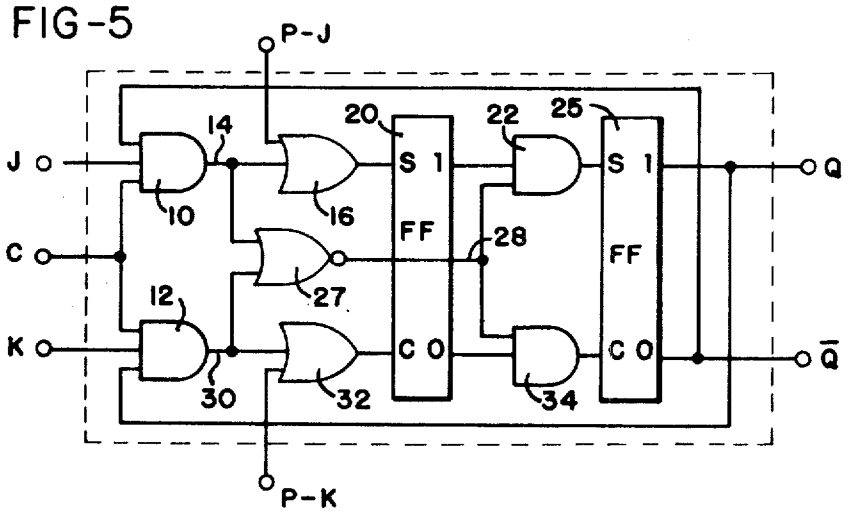
FIG. 5 is a circuit diagram showing details of a typical one of the storage registers shown in block form in FIG. 3.

The fourth symbol represents a shift register stage, in the present case, this stage being a circuit which is known in the art as a JK flip-flop. Details of a suitable circuit are shown in the expanded logic diagram in FIG. 5. The dotted outline in FIG. 5 represents the logic incorporated within the symbol shown in FIG. 4. The circuit is essentially a flip-flop arrangement with a toggled or clock-controlled input. For purposes of explanation, it will be assumed that the input line labelled J is the input on which a 1 or set signal is applied, and the input labelled K is that on which an 0 or clear signal is applied. The input labelled C is the clock pulse or control input which governs the actual application of signals on the J input or the K input to the circuit. The set or 1 output is labelled Q and the clear or 0 output is $\overline{Q}$. The preset input to the 1 state is labelled P–J, and the preset input to the 0 is labelled P–K.

The J input is connected to a first AND gate 10, and the K input is connected to a first AND gate 12. The C input is connected to both of the AND gates 10 and 12, therefore these AND gates are inhibited except when there is a high or set signal on the C input. In addition, there is a feedback connection from the Q output to the AND gate 12 and a similar feedback connection from the $\overline{Q}$ output to the AND gate 10.

For purposes of explanation, it will be assumed that the entire circuit is in its clear or 0 state, hence the Q output is at a low level and the $\overline{Q}$ output is at a high level. Then, assuming that it is desired to chang the state of the circuit, a high level signal, for example a pulse of substantial length (several microseconds), is applied to the J input line. Because of the conditions assumed, the AND gate 12 is inhibited due to the low signal at its feedback input from the output line Q.

When a short clock pulse (in the order of 100 nanoseconds) is applied to the clock input C, there will be simultaneously three high inputs to the AND gate 10 and its output line 14 will go to a high level. This results in a signal passing through the OR gate 16 to the set input, labelled S, or the master flip-flop 20. This master flip-flop is a conventional bistable circuit. As a result, its output, labelled 1, will go to a high state and will apply a high signal at one of the inputs of the secondary AND gate 22, which in turn has its output connected to the set input S of the slave flip-flop circuit 25. The circuit 25 is also of a conventional flip-flop or bistable circuit.

However, because the output at line 14 was a high signal, the NOR gate 27 produces a low signal at its output 28, and this inhibits the AND gate 22. Therefore, although the master flip-flop has been set, it is not yet possible to set the slave flip-flop.

When the clock pulse, being the shortest duration signal applied to the inputs, is terminated, then the output of AND gate 10 drops to a low level since that gate is inhibited. Therefore, the output of the NOR gate 27 goes to a high level, and the resulting high level on line 28 enables the AND gate 22, and hence the high signal at its output sets the slave flip-flop 25. At that time, the Q output goes to a high level, and the $\overline{Q}$ output necessarily goes to a low level, and this condition remains until a different condition is set up at the J and K inputs. If, for example, the next input signals should also be those for a 1 or set condition, another high level would appear at J, but since the slave flip-flop is already in its set condition no change in the outputs would occur.

On the other hand, if a clear signal is applied, as a high level at the K input, then essentially the same sequence will occur as previously. However, since the Q output is now high, its feedback connection to AND gate 12 will be high and the clock pulse will enable AND gate 12, and this will produce a high level at its output 30. This high signal passes through the OR gate 32 and is applied to the clear input C of the master flip-flop 20, setting it to its clear or 0 state. In similar fashion, the output of NOR gate 27 will be low at this time, and thus the low signal on line 28 will inhibit the secondary AND gate 34 on the clear side of the circuit. When the clock pulse ends, then the AND gate 34 will be enabled as line 28 goes to a high level, and this will result in a high signal being applied to the clear input C of the slave flip-flop 25. Therefore, the slave flip-flop will shift, and its output $\overline{Q}$ will go to a high level, with the Q output necessarily goin to a low level.

The inputs P–J and P–K are used to preset the circuit to either a set state or a clear state, as may be desired. A high level on the input P–J will pass through OR gate 16 and set the master flip-flop 20 if it is not then in its set condition. Similarly, a high level on the P–K input will pass directly through OR gate 32 to the clear input of the master flip-flop 20, changing it to its clear state if it is not already in that state. In either event, once this occurs, the corresponding AND gate 22 or 34 will be enabled since line 28 will be at a high level, there being no clock pulse during the preset function. As a result, the slave flip-flop 25 will immediately be made to assume the condition of the master flip-flop.

With the foregoing in mind, reference is made to FIG. 1 which illustrates, in block diagram form, a suitable system in which the register circuit provided by this invention is particularly useful. A manually operated keyboard 40 is provided with a suitable encoder 42, shown as including 8 normally open switches. These switches, starting at the top, are arranged according to a suitable code. Thus, the switches are designated by the reference numerals 42–0 . . . 42–5, 42–00. One or more of these switches are closed according to the code identifying a particular key struck on the keyboard. The switch 42–00 is the shift-unshift switch, while the others correspond to the six character identifying digits of the code. Also, preferably there is a last-closing switch 43 which is arranged to close along with, but slightly after, any of the other code switches in order to provide a signal that a complete code is available from the keyboard. In addition, there is a switch 44 which is closed whenever the end-of-line or elevate key is struck. This key and the switch 44 can replace the elevate code, since in this form of the apparatus the keyboard is in direct control of the typesetting machine for all practical purposes.

The output from the encoder 42 and the switch 44 is provided as a nine-line cable 45 which extends to the input of the novel shift register 50 which is the basic feature of this invention. This cable is also identified on FIG. 3. The output from the shift register is a nine-line cable 52 which extends to a decoder and operating unit 54 connected to control a typesetting machine, shown schematically at 55. The decoder may be, for example, of the type disclosed in U.S. Patent No. 3,278,005.

The invention also is applicable to apparatus for producing record controls such as perforated tape to be used in the automatic operation of typesetting machines. The general arrangement of such apparatus is shown in FIG. 2. Like reference numerals with the suffix *a* are applied to parts which are similar to the devices shown in FIG. 1. Here, the keyboard **40*a* is connected to operate an encoder device 42*a* which is arranged to produce a seven-digit coded output, as through the seven switches shown, and this output is passed through the seven-line cable 45*a* which also includes a branch cable 45*b*, in parallel from the first six lines, directed to a suitable perforator control and drive 45*a*. This control operates a perforating punch, or some equivalent recorder, indicated generally at 48*a*, to produce codes on the control tape 49*a***, and the control tape can subsequently be used to operate an automatic typesetting machine.

Figure 3:
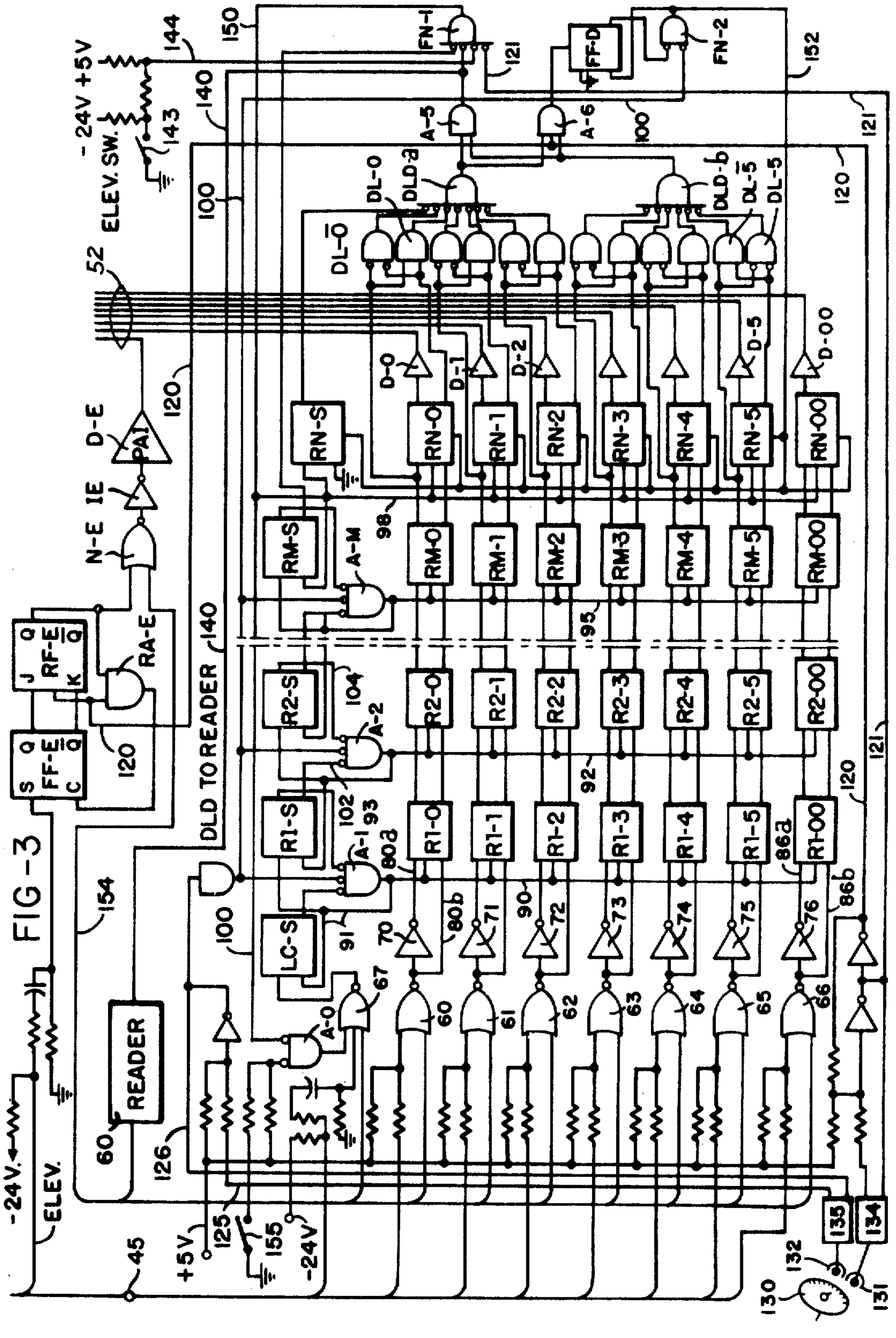
FIG. 3 is a schematic logic diagram illustrating the details of the novel shift register device provided by the invention.

The cable **45*a* extends to the input of a shift register 50*a*, which is essentially of the same type shown in FIG. 3, and the output from this shift register is connected through a seven-line cable 52*a* to a suitable decoder apparatus 54*a* which in turn drives a printer 55*a*. In this system, the manipulation of the keyboard results in recording of the codes on the type 49*a*. At the same time, the codes are passed into the shift register 50*a* and used to operate the printer 55*a* which produces, almost immediately, a hard copy output that can be viewed by the keyboard operator. However, the hard copy output, which may be, for example, in the form of a typed page produced on an automatic typewriter, such as shown in U.S. Patent No. 2,919,002, is not necessarily divided into lines according to the operation of the end-of-line or elevate key on the keyboard. Rather, the keyboard operation is essentially continuous, and when the printer nears its line capacity it operates through a carriage return function while keyboarding continues. During this period, the codes products from keyboard operation are stored temporarily in the shift register 50***a*, and when the carriage return operation is completed at the printer, it then begins to read the codes through the shift register output. Since the printer can operate faster than the fastest possible operation of the keyboard, the printer readily catches up to the keyboard operation.

In either of the systems shown in FIG. 1 or in FIG. 2, the input to the shift register is provided by a keyboard which may be in the form of an ordinary typewriter layout, or in the form of a 90-key layout such as is conventional in typesetting machinery. The form of keyboard used will depend upon, for example, the type of personnel which it is desired to operate the system. For example, in the system shown in FIG. 1, the most usual arrangement would be to have an operator with experience in direct control of linecasting machines, hence the 90-key keyboard layout would be most likely used. On the other hand, in the system shown in FIG. 2, it might perhaps be more desirable to use an ordinary typewriter keyboard layout so that typists who are not experienced in printing composition could operate the system.

In the system shown, in FIG. 1, in order to provide a system with optimum versatility it is desirable to have the capability to operate from a tape reader or similar input as well as from the manual keyboard. Therefore, a typical perforated tape reader 60, is shown in block form in FIG. 3, connected to provide an alternative input to the shift register circuits. Details of a suitable reader and associated decoder are disclosed in U.S. Patent No. 3,278,003, however the double-letter detector and controls described therein are unnecessary in view of the similar features provided by the present invention. Also, because the reader can provide a more rapid and uniform output than a manual keyboard, as a practical matter there will be no storage of codes in the register and input codes will be shifted quickly to the register output. However, no change in the basic function is required in changing to tape reader input.

In either event, however, the codes produced by operating the keyboard will be supplied to the shift register at a fairly regular rate which, while it may be somewhat faster than the normal operation of the linecasting machine keyboard, will nevertheless be substantially slower than the rate at which the typesetting machine can assemble character mats, or the rate at which the hard copy printer can print individual characters. On the other hand, the typesetting machine must go through its elevate or end-of-line function, or the printer must go through its carriage return function, and in either case there is a delay at this time which results in a net slow-down in the overall operation of the system. By permitting the keyboard operator to continue during these function operations, the invention makes it possible to achieve a net saving in time in the system operation.

Figure 6:
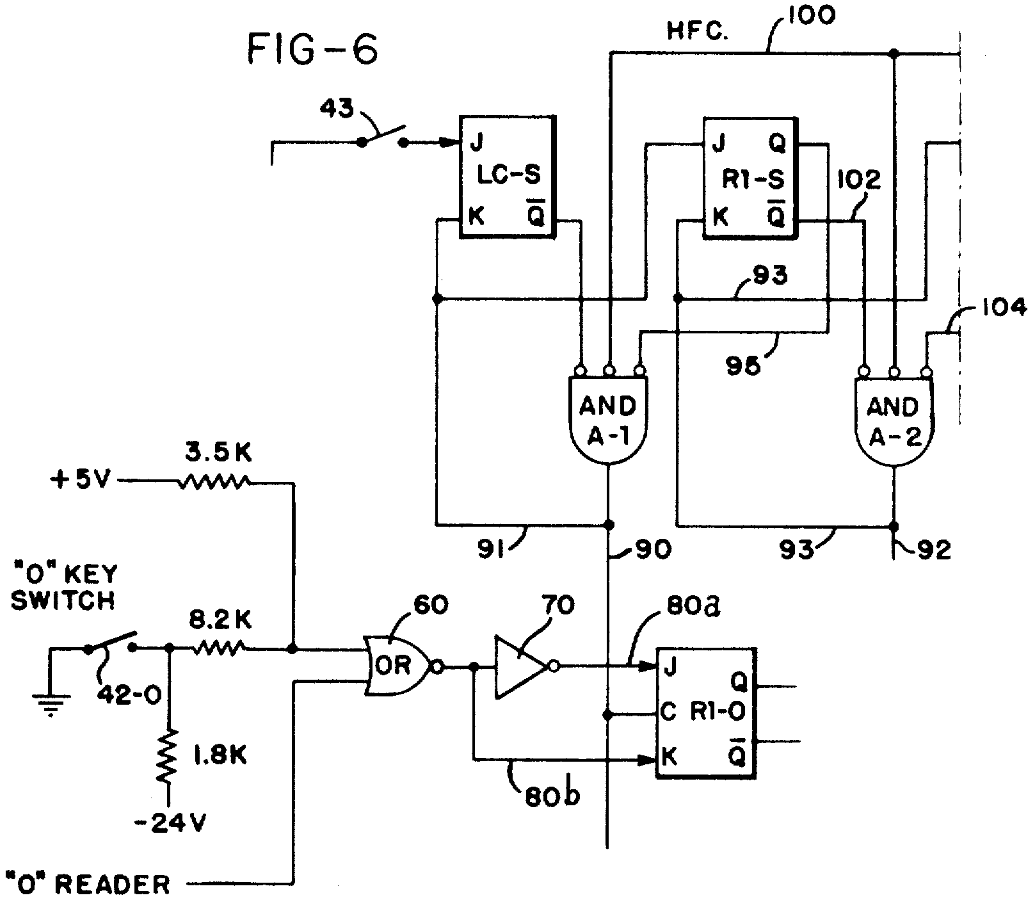
FIG. 6 is an enlarged diagram of a portion of FIG. 3, showing the input connections to the shift register.
Figure 7:
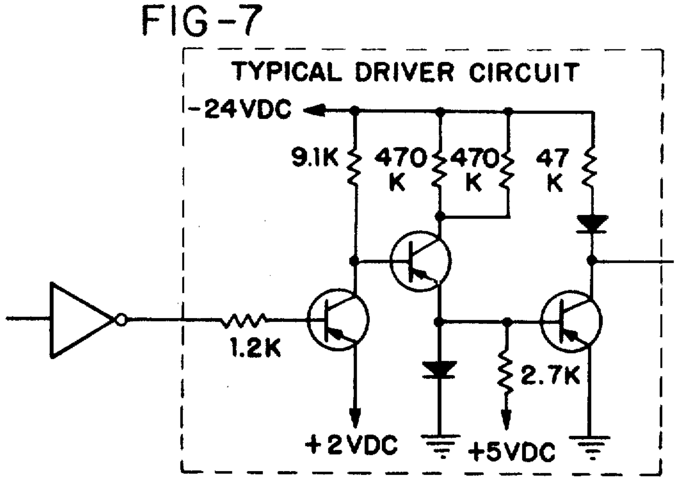
FIG. 7 is a schematic diagram of a driver circuit for the control solenoids of the typesetting machine.

The logic diagram of the shift register 50 and associated circuits is shown in FIG. 3, and FIG. 6 is an enlarged logic diagram of a portion of FIG. 3. In FIG. 3 the encoder switches 42–0 etc. are shown as providing inputs to NOR gate circuits 60, 61, 62, 63, 64, 65, and 66, and the last closing switch 43 is connected to one of the inputs of a similar NOR gate circuit 67. The output of each of the NOR gates 60 . . . 66 is connected to the input of a corresponding inverting amplifier 70 . . . 76. The output of the NOR gates also is connected directly around the corresponding inverting amplifier, and hence the output signal (high or low) from each NOR gate is available as both a high and low signal on corresponding lines 80*a* and 80*b* . . . 86*a*, 86*b*. These lines are connected to the J and K inputs of corresponding ones of the first bank of shift register circuits, which are identified as R1–0, R1–1 . . . R1–00. These seven register circuits each are of the type shown in FIG. 5 and previously explained. An input to any one of these registers will have no effect on the state of the corresponding register circuit until a clock pulse or signal is available at the clock input C of each register circuit. The clock input for each of this first bank of registered circuits is provided through the line 90, which is connected to the output of NAND gate A–1.

The shift register incorporates a number of additional banks of register circuits, each bank consisting in the illustrated example of seven registers, and the next bank receives its inputs from the outputs of the corresponding preceding registers. Thus, for example, register circuit R2–0 has its J and K inputs connected to the Q and $\overline{Q}$ outputs of R1–0, and the other register circuits of the second bank are connected in like manner to corresponding registers of the first bank. The clock or shift signals for the second register bank are provided on line 92 from the output of AND gate circuit A–2. The number of banks in the shift register can be variable, depending upon the capacity desired. Therefore, in FIG. 3 dot-dash lines indicate a break in the circuit where additional banks of register circuits can be connected in the same manner. The second last bank of register circuits is designated by the legends RM–0, RM–1 . . . RM–00, and the clock or shift pulses for this bank are available from line 95 which is in turn connected to the output of AND gate circuit A–M. The final or output register bank is designated by the legends RN–0, RN–1 . . . RN–00. Its common shift or clock pulse line 98 is connected to a separate source of shift pulses, as will be later described.

Referring to FIG. 6, the keyboard encoding switch 42–0 is normally open, and its output contact is connected to a voltage divider circuit which in turn leads to one of the inputs of the NOR gate circuit 60. When this switch is closed a high level appears at the input of this NOR gate, and therefore a low level signal will be available at the output of this gate. As a result of the action of the inverting amplifier 70, a low level signal will be available on line 80*b*, and a high level signal will be available on line 80*a*, which is connected to the output of the inverting amplifier. Therefore, when switch 42–0 closes a high level signal is available at the J input of the register circuit R1–0, and a low level is available at its K input. The register does not change condition, however, until a shift signal or pulse appears at its C input via the line 90.

switches is closed, in response to actuation of a key on the keyboard, the last closing switch 43 closes shortly thereafter. Closing of this switch results in a change in the output of the voltage divider circuit to which it is connected and as a result the NOR gate 67 has a low level signal at its output which in turn is applied to the J input of a status flip-flop control circuit LC–S. This flip-flop circuit therefore is set to its "1" state, and a low output level signal is available at its $\overline{Q}$ output which leads to the AND gate circuit A–1, indicating that a code is available at the register input circuits from the keyboard (or reader as the case may be).

There is a corresponding status flip-flop circuit R1–S which is provided to record the presence or absence of code information in the first bank of register circuits. If a code is present in this bank R1–S will be in its set or "1" condition. This occurs because the line 91, which is connected to the shift output line 90 of gate A–1, also leads back to the reset input K of the flip-flop LC–S and to the set input J of the flip-flop R–S. Hence, R1–S will be set whenever there is an output from AND gate A–1 permitting information to be set into the first bank of register circuits.

Conversely, if the first bank of register circuits is empty and available to receive information, R1–S will be in its reset or "0" condition and a level signal will be available at the Q output of R1–S. This output is connected through line 95 to another of the inputs of NAND gate A–1. Therefore, it is also a condition for shifting of information into the first bank of register circuits that the corresponding status flip-flop R1–S be in its reset condition.

If LC–S is set, and R1–S is reset, a high frequency clock pulse from supply line 100 will complete the AND gate inputs to A–1, since all of the three inputs to this gate circuit will then be at a low level. When this occurs there will be an output from A–1 over lines 90 and 91. Until this condition occurs, LC–S will not be reset, and therefore another code cannot be transferred through the encoder and the NOR gates 60–66.

The $\overline{Q}$ output of R1–S is low when this flip-flop is in its set condition, correspondng to presence of code information in the first bank of register circuits. This output is connected by line 102 to one of the inputs of AND gate circuits A–2. Another input to A–2 is from the "not" high frequency clock pulse line 100, and the third input is from the Q output line 104 of the next succeeding status flip-flop (for example R2–S). As previously mentioned, the output line from A–2 is the shift or clock line 92 for the second bank of register circuits. This line is also connected to the feedback line 93 which leads to the K or reset input of R1–S and to the J or set input of R2–S. Therefore, when code information is transferred into the second bank of register circuits by an output on line 92, R1–S is reset to indicate that the first bank is available to receive information, and the status flip-flop R2–S is set to indicate that the second bank now contains information.

Subsequent register banks (FIG. 3) are connected in like manner, each having an AND gate circuit which controls the shifting of information into that bank, each having a corresponding status flip-flop, and there are corresponding feedback connections from the output of each of the AND gate circuits to reset the status flip-flop of the preceding bank and simultaneously to set the status flip-flop of that register bank which the AND gate controls.

The second from last bank of register circuits, RM–0 . . . RM–00 is the same as the preceding banks, and receives and passes on information in the same manner. The final bank of registers RN–0 . . . RN–00 is controlled somewhat differently, and the feedback connection and shifting or clock connection line 98 is arranged to receive clock pulses at a lower rate than those available on line 100. It is appropriate therefore to consider the source of shifting or clock pulses in greater detail.

Bearing in mind that a typesetting machine, or printer as in FIG. 2, is controlled by the shift register output, it is desirable to synchronize the output rate of control codes to the operation of the machine. In the present system clock pulses are made available at a lower rate on lines 120 and 121, these also being labelled LFC and $\overline{\text{LFC}}$, respectively, indicating a source of low frequency clock pulses LFC, and the inverse or absence of these pulses $\overline{\text{LFC}}$. In a typical system constructed according to the invention these pulses are available at a rate of one every eighty-eight milliseconds, and each pulse has a duration of about one millisecond.

The higher frequency pulses are made available on line 125 (HFC) and on line 126 ($\overline{\text{HFC}}$). These pulses are supplied at a much greater rate than the LFC pulses, for example twenty HFC pulse to one LFC pulse. Also, the phasing of the two pulses is controlled such that a HFC pulse will not overlap on LFC pulse. A convenient source of these pulses is from a light chopper arrangement driven by the bail of the escapement control, such as shown in U.S. Patent No. 3,278,005.

As shown in FIG. 3, a light chopper disc 130 can provide one pulse per revolution from photocell 131, and substantially more pulses per revolution from photocell 132 (e.g. twenty pulses/rev.). The outputs from these photocels are directed to suitable amplifiers 134 and 135, which shape and amplify the outputs and direct the desired pulses to the corresponding circuits.

The LFC pulses, being synchronized with the machine, are directed in a feedback control which is coupled to the final register stages RN–0 . . . RN–00, and including delay means to provide an extra machine cycle when a double letter is detected, by appearance of the same code twice in succession in the final registers. The Q outputs of each of the final registers are connected to driver circuits D–0 . . . D00 which control the selection of matrices by the typesetting machine (or character selection by printer 55*a*), through the decoder 54. The driver circuits are shown providing the outputs to seven lines of the cable 52, the eighth output line coming from driver amplifier D–E of the elevate control circuit, which is described later.

Each of the final registers RN–0 . . . RN–5 is connected to a corresponding pair of double letter logic gates, there being one AND gate and one NAND gate for each register. Referring to register RN–0, there is a related NAND gate DL–$\overline{\mathbf{0}}$ and related AND gate DL–0. The registers RN–1 through RN–5 have similarly labelled gates, but there are no logic gates for register RN–00 because information in this register indicates the shift or unshift condition, usually the difference between upper or lower case, and will not change in any event if a double letter occurs. The J input to register RN–0 is connected to an input of each of the gates DL–0 and DL–$\overline{\mathbf{0}}$, and the $\overline{Q}$ output of register RN–0 is also connected to other inputs of these gates.

As an example, in register RN–0 is set, in its "1" condition, its output $\overline{Q}$ will be low, and the connected inputs to the gates will provide a low level input to gate DL–0 and a low level input to gate DL–$\overline{\mathbf{0}}$ which is inverted due to the negated input of the NAND gate. If the J input to RN–0 is high, indicating that RM–0 is in its "1" condition, there will be high level inputs to both gates, and both will be inhibited, hence the outputs of gate DL–0 and DL–$\overline{\mathbf{0}}$ will be at a low level. Should this same condition occur at all the other double letter logic gates, all of their outputs will be at a low level. If any set of these logic gates detects an incoming change in the digit of the code which that set is monitoring, there will be at least one high level output from the double letter logic gates.

The outputs of all the double letter logic gates are directed to one of a pair of NAND gates DLD–*a* or DLD–*b*, together with a connection from the $\overline{Q}$ output of the status flip-flop RN–S. This output must also be low, indicating a code is present in the last register bank, before the detector can function, since a high level will inhibit the NAND gate DLD–*a*. In practice, one NAND gate could be used, however circuits are not easily available which have more than seven inputs, hence the diagram shows the practical arrangement at present.

The outputs from each of NAND gates DLD–*a* and DLD–*b* are each connected to inputs of AND gates A–5 and A–6, and gate A–6 also has an input connection from the LFC line 120. Anytime a double letter is detected there will be an immediate and sustained high level output from A–5, since its only inputs are from DLD–*a* and DLD–*b*. This output is connected to one of the inputs of the feedback control NAND gate FN–1, and also is connected through line 140 to the reader 60, to provide a delay signal to it when the input is from the reader. This will cause an appropriate delay in the reader output if it should happen that the entire shift register is full at such time.

The output of A–6 is connected to the pre-set input PJ of a delay control flip-flop FF–D. Such an output will occur, and set the flip-flop to its "1" state, only when there is a double letter detected and an LFC pulse occurs. The $\overline{Q}$ output of FF–D is connected to one of the inputs of NAND gate FN–2, and the other input to this gate is from the HFC pulse line 100.

When there is no detection of a double letter, the output of A–5 will be low, and tends to enable the NAND gate FN–1 due to the logic negation. If the assembly elevator of the typesetting machine is not raised the switch 143 will be open and line 144 will be at a low level, tending to enable FN–1. (This control is not needed for this purpose with the printer 55*a*, but is needed for controlling most typesetting machines.) When status flip-flop RM–S is in its "1" state, indicating presence of a code in its register bank, its $\overline{Q}$ output is low and hence tends to enable FN–1. Finally, if all these conditions exist, the next $\overline{LFC}$ pulse on line 121 will enable FN–1 and its output will transmit a high level feedback pulse over line 150 to line 98, transferring the code word into the last register bank RN–0 . . . RN–00, and actuating the decoder 54. The actual output of control codes to the machines is thus normally at the low frequency pulse rate and synchronized with the machine.

If a double letter is detected the output of A–5 goes to a high level and this inhibits FN–1. The output of A–6 will go to a high level when it is enabled by the next LFC pulse, and this sets FF–D to its "1" state, its $\overline{Q}$ output going low. The next $\overline{HFC}$ pulse from line 100 will enable FN–2, and its output will go to a high level. This is fed back to the K input of FF–D, resetting it to its "0" state, and is also connected through line 152 to each of the P–K pre-set inputs of registers RN–0 . . . RN–00, changing them all to the "0" state along with their status flip-flop RN–S. The next $\overline{LFC}$ pulse will cause a code to move from the RM bank to the RN or final bank of registers, and FN–2 is inhibited by reason of its own feedback output to FF–D. However, one LFC pulse is skipped over in this operation, thereby providing a one cycle delay to assure that the typesetting machine releases two matrices for the double letter.

Of course, some forms of printer do not require a double letter delay, therefore these circuits are not necessary in controlling such machines. Also, some forms of decoder may require an inhibit signal when the $\overline{HFC}$ pulse clears the last registers during the double letter function, and this may obviously be provided, however the decoder described in aforementioned Patent No. 3,278,005 does not need such inhibition due to its inherent "one per cycle" operation for selecting matrices.

When the elevate key 44 is closed at the keyboard, this will produce a high level input to set the control flip-flop FF–E to its "1" state. The Q output of this flop-flop provides a high level to the J input of the elevate control register RF–E, and this register is toggled or set by the next LFC pulse over line 120. The register RF–E then is set to its "1" state and its output Q goes to a high level. This output is connected to a NOR gate N–E, and its output drives the elevate driver amplifier D–E through an inverting amplifier I–E.

With the Q output of RF–E at a high level, the reset AND gate RA–E will be enabled by the next LFC pulse on line 120. The output of RA–E leads to the reset input of flip-flop FF–E, changing it to its "0" state. In the meantime, the elevator of the typesetting machine is actuated and switch 143 is closed, inhibiting FN–1 until the elevator returns. The $\overline{Q}$ output of FF–E is connected to the K input of RF–E, hence the next LFC pulse will toggle RF–E back to its reset or "0" state, and its Q output will drip to a low level, no longer enabling the NOR gate N–E.

The line 154 leads from the reader 60 directly to NOR gate N–E, and will provide an elevate signal directly from the reader when operating under its control. The elevate register circuits are bypassed since the reader output signal will be of sufficient duration to assure completion of the elevate function.

Theoretically, sufficient time between successive elevate signals should be assured to avoid the possibility that one or more codes could remain in the registers when an elevate code is read. However, in practice it is observed that the machine has over-taken the manual keyboard operation before the second of two successive elevate signals occurs (identifying the beginning and end of a line). Therefore, as a practical matter, no interlock has been found necessary to avoid operation of an elevate (or carriage return) while one or more codes remain in the register. Under tape-reader control, since machine operation and reader operation are synchronized, there is no storage in the register and the aforementioned condition is not even possible.

It will be noted that line 150 also leads to an AND gate A–0, and provides one of two negated inputs to this circuit. The output of AND gate A–0 is connected to one of the inputs of OR gate 67 which has previously been described. The other negated input to AND gate A–0 is normally inhibited, however this input can be enabled by closing of switch 155. When switch 155 is closed and any key at the keyboard is held depressed, the same code will continue to be processed repeatedly through the shift register, thus providing a convenient arrangement for emptying any given channel of a typesetting machine. This feature is only of significance in connection with the invention as applied to line casting and similar machines.

The present invention therefore provides a register control for typesetting machines or printers in which the output of control information from the register is at a regular rate synchronized with the operation of the machine, and in which the input to the register may be more irregular but at some times a faster rate than the output or use rate of the information. The invention also provides a novel synchronous shift register in which code information is rapidly moved toward the register output and stored in a register bank as near to the output as is available. Further, as applied to control of typesetting machines, the invention provides a novel double letter detection and delay arrangement.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a typesetting system, the combination of an automatically operable typesetting machine including a decoder adapted to drive said typesetting machine at a predetermined rate from code signals applied to said decoder;

an electronic shift register having a plurality of serially connected storage registers, each of said storage registers being capable of storing a code word comprised of a plurality of code signals, said shift register including an input storage register and an output storage register and at least one intermediate storage register;

input signal means connected to the inputs of said input storage register for applying thereto code words representing a predetermined succession of character, interword space, and function control code words identifying lines of composition to be prepared by the typesetting machine;

output control signal means connected to said output storage register and extending to said decoder for applying to said decoder the code word represented in said output storage register;

a status register for each of said serially connected registers to provide an indication of whether a code word is stored in the corresponding storage register;

an output control circuit means including a source of lower frequency shifting pulses connected to control the transfer of code words from said output register to said decoder at a rate corresponding to the ability of said decoder to accept the code words and operate the typesetting machine;

and a source of higher frequency shifting pulses and gating circuits responsive thereto and to the condition of said status registers for shifting code words from said input register through said intermediate storage registers and into said output register at a substantially greater rate whereby code words received from said input signal means are normally shifted through said intermediate storage register to said output storage register at a substantially greater rate than the rate at which the code words are supplied to said input signal means or utilized by said decoder, said intermediate storage register forming a temporary storage for a plurality of the code words in the proper succession whenever the rate of use of said decoder temporarily falls behind the rate at which code words are supplied to said input signal means.

2. A typesetting system as defined in claim 1, wherein said input signal means includes a manually operable keyboard and an encoder operated by said keyboard and connected to apply a code word for each key operation to said input storage register.

3. A typesetting system as defined in claim 2, wherein said input signal means also includes a control record reader and connections from said reader to said input storage register.

4. A typesetting system as defined in claim 1, wherein said output control circuit means includes a double letter detector circuit and circuits responsive thereto for delaying the output from said output register after the first occurring code of a double letter code succession.

5. A typesetting system as defined in claim 1, wherein there are at least two intermediate storage registers, and said gating circuits include AND gate devices responsive to the condition of the status register for a corresponding intermediate storage register and to the condition of the status register for the next preceding storage register controlling the shifting of code information through the intermediate storage registers in response to higher frequency shifting pulses.

6. A shift register capable of providing a synchronized code output from a random timed input; comprising a plurality of serially connected input and output storage registers and at least one intermediate register connected between each input and output register;

each of said registers having a set input and a clear input, a set output and a clear output, and a toggle circuit controlling the application of input signal levels to said inputs;

input signal means connected to the inputs of said input registers;

output signal circuit means connected to at least one of said outputs of each said output registers;

a plurality of status registers corresponding in number to said serially connected storage registers, that status register corresponding to said input register having a connection from said input signal means;

an AND gate circuit for each of said plurality of serially connected storage registers and having its output connected to control the toggle circuit for the corresponding register;

means providing a source of shifting pulses connected to an input of each of said AND gate circuits;

circuit connections to each of said AND gate circuits from the status register of the next lower order storage register and from the status register of the storage register to which the AND gate circuit corresponds such that a signal can be applied to the corresponding storage register only when it is not storing a signal and a signal is available from the preceding lower order storage registers; and an output from each of said AND gate circuits to the preceding lower order status register and to its corresponding status register for clearing the lower order status register and setting the corresponding status register as a signal is transferred into the corresponding storage register.

7. A shift register as defined in claim 6, including a source of lower frequency shift pulses timed to correspond to the operating rate of the device to which said output signal control means is directed, detector circuits connected to determine whether a signal exists in said output registers, and an AND gate circuit means operable under the joint control of said detector circuit and both said sources of shifting pulses and having a control output connection to the toggle circuit of said output registers whereby control signals can be applied to said output signal controlling circuit means only on demand from the device being controlled by the shift register output.

8. A shift register as defined in claim 7, including detector circuits arranged to compare the code in said output registers with the code in the next lower order register and operable to delay the application of the control signals resulting from the second of two successive identical codes.

References Cited

UNITED STATES PATENTS

| | | | |
|---|---|---|---|
| 2,951,233 | 8/1960 | Tanco et al. | 340—172.5 |
| 3,051,929 | 8/1962 | Smith | 340—172.5 |
| 3,274,559 | 9/1966 | Giroux et al. | 340—172.5 |
| 3,278,003 | 10/1966 | O'Brien et al. | 197—20 X |
| 3,278,004 | 10/1966 | O'Brien et al. | 197—20 X |
| 3,292,764 | 12/1966 | Midgette et al. | 199—18 |
| 3,331,954 | 7/1967 | Kinzie et al. | 340—172.5 |

PAUL J. HENON, Primary Examiner

P. R. WOODS, Assistant Examiner

U.S. Cl. X.R.

197—20; 199—18

PO-1050
(5/69)

UNITED STATES PATENT OFFICE
CERTIFICATE OF CORRECTION

Patent No. 3,470,539 Dated September 30, 1969

Inventor(s) Ralph A. Proud, Jr., Richard C. O'Brien, Seth Graubert Neil Schleifman, Theodore J. Goldstein It is certified that error appears in the above-identified patent and that said Letters Patent are hereby corrected as shown below:

Column 3, line 26, "chang" should be --change--. Column 4, line 5, "goin" should be --going--. Column 6, line 55, the phrase beginning the paragraph --As previously mentioned, when any of the encoding-- should be included. Column 6, line 74, "flip-flop RS" should be "flip-flop R1-S--. Column 8, line 7, "photocels" should be --photocells--. Column 8, line 17, "D00" should be --D-00--. Column 9, line 72, "drip" should be --drop--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents